United States Patent [19]

Baus

[11] 4,312,395
[45] Jan. 26, 1982

[54] DOUBLE CONTOUR BLOCK TREAD PATTERN

[75] Inventor: André E. J. Baus, Bettembourg, Luxembourg

[73] Assignee: The Goodyear Tire & Rubber Company, Akron, Ohio

[21] Appl. No.: 105,433

[22] Filed: Dec. 19, 1979

[51] Int. Cl.³ .................... B60C 11/10; B60C 11/12
[52] U.S. Cl. ...................... 152/209 R; D12/136; 152/209 D
[58] Field of Search .......... 152/209 R, 209 D, 209 A, 152/209 NT, 209 WT; D12/136, 137, 138, 139, 140

[56] References Cited

U.S. PATENT DOCUMENTS

| D. 47,947 | 10/1915 | Christian | D12/137 |
|---|---|---|---|
| D. 53,498 | 7/1919 | Greenspan | D12/137 |
| D. 57,431 | 3/1921 | Greenspan | D12/138 |
| D. 61,553 | 10/1922 | Worth | 152/209 D |
| D. 929,632 | 7/1909 | Doughty | D12/139 |
| 1,468,439 | 9/1923 | Cozakos | 152/209 R |
| 2,267,406 | 12/1941 | Krusemark | 152/209 R |
| 3,998,256 | 12/1976 | Verdier | 152/209 R |

FOREIGN PATENT DOCUMENTS 600768  6/1960  Canada .
7811273  9/1978  Fed. Rep. of Germany .

OTHER PUBLICATIONS

Hays et al., The Physics of Tire Traction, pp. 252-254, 1973, Plenum Press, NY-London.

Primary Examiner—Michael W. Ball
Attorney, Agent, or Firm—Frank Pincelli

[57] ABSTRACT

An improved pneumatic tire having a tread portion comprising a plurality of independent projections. Each independent portion has a configuration substantially that of a closed loop.

12 Claims, 4 Drawing Figures

DOUBLE CONTOUR BLOCK TREAD PATTERN

The foregoing abstract is not to be taken as limiting the invention of this application, and in order to understand the full nature and extent of the technical disclosure of this application, reference must be made to the accompanying drawings in the following detailed description.

BACKGROUND OF THE INVENTION

This invention relates to pneumatic tires, and more particularly, to an improved pneumatic tire for use in snow and ice. The tread portion of a pneumatic tire as it travels through the footprint of the tire experiences many different forces. The principal lateral force experienced by the tread portion of the tire under normal dry road conditions is the longitudinal force parallel to the direction of travel of the tire. The lateral force experienced by the tread portion on dry pavement is generally too small in comparison to the longitudinal force to be of any major consequence. However, when the tire is used on snow or ice-covered roads, the coefficient of friction between the tread portion of the tire and the road surface is substantially reduced, thereby increasing the importance of lateral stability of the tread portion of the tire.

Applicants have developed an improved tire for use on snow and ice-covered roads which has improved lateral stability and gripping action. A tire made in accordance with the present invention is provided with a plurality of spaced independent projections about the tread portion of the tire. Each projection has an outer configuration which is substantially polygonal as viewed in a plane perpendicular to the tread portion. Each projection is further provided with a recessed portion approximately in the center of the projection to form an inside contour substantially identical to the outside contour of the projection. A plurality of blades or sipes extend from the recessed portion of each projection substantially radially outward to the outside surface so as to divide the independent projection preferably into a plurality of substantially identically shaped sub-elements.

DETAILED DESCRIPTION OF THE INVENTION

Figure 1:
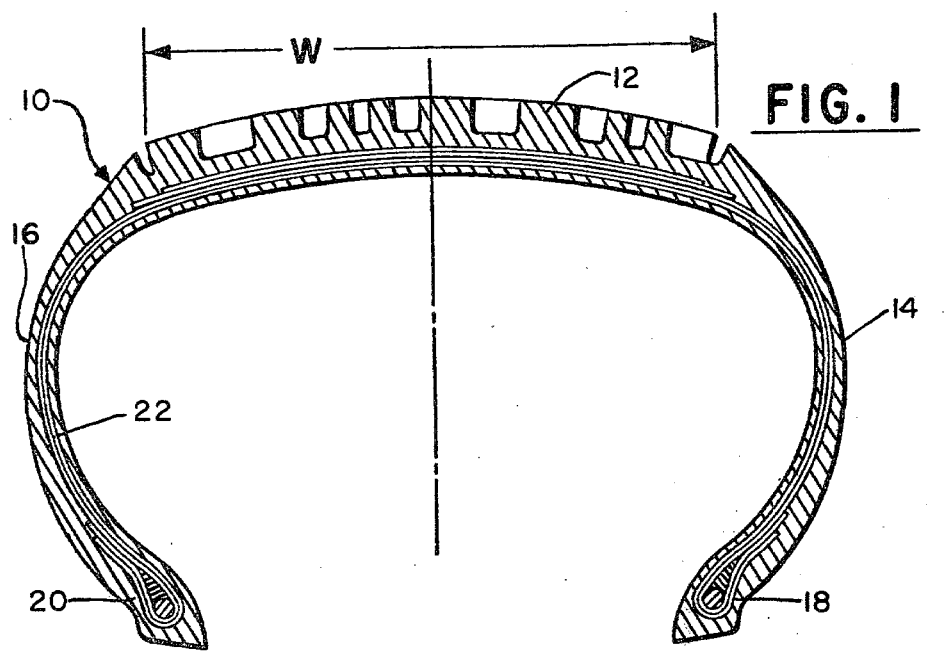
FIG. 1 is a cross-sectional view of a tire made in accordance with the present invention.
Figure 2:
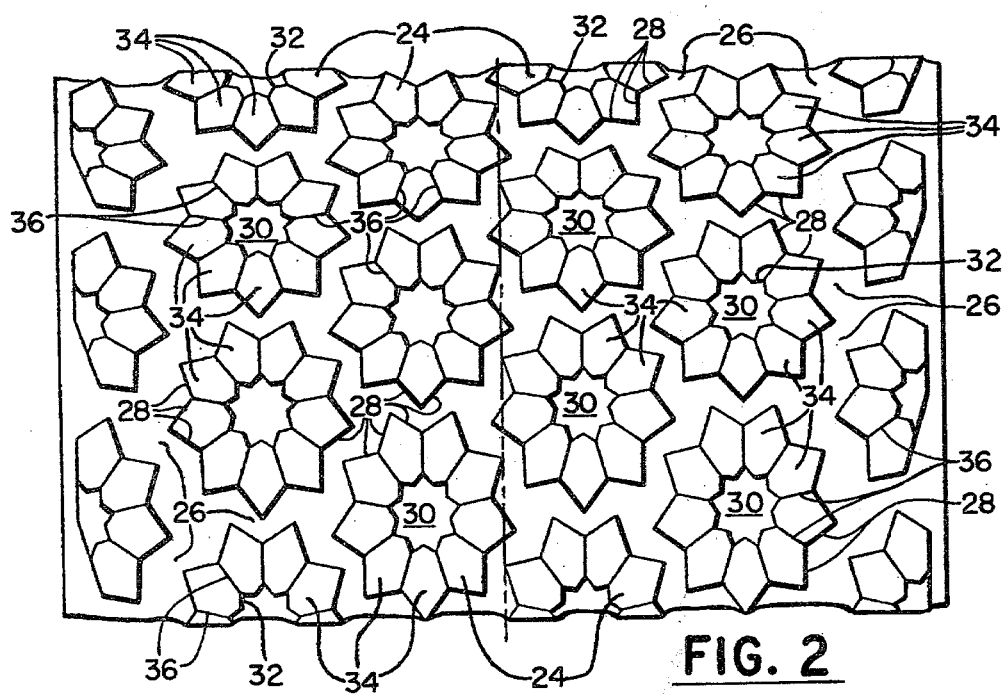
FIG. 2 is an enlarged fragmentary plan view of the tread portion of the tire illustrated in FIG. 1.

Referring to FIGS. 1 and 2, there is illustrated a tire 10 made in accordance with the present invention. The tire 10 has a circumferentially extending ground-engaging tread portion 12. A pair of sidewall portions 14,16 extend radially inward from said ground-engaging tread portion 12 terminating in a pair of bead portions 18,20 respectively. A cord-reinforcing ply structure 22 extends from bead portion to bead portion and comprises at least one layer of cord-reinforced fabric. Preferably, the cords of the layers of the carcass ply structure 22 form an angle with respect to the mid-circumferential plane of the tire from about 75° to 95°.

The tread portion 12 comprises a plurality of independent buttons or projections 24 spaced circumferentially about the tire 10. For purposes of this invention an independent projection shall be considered a projection in which the length of the projection is less than about one-half the width of the tread portion. Preferably, the width of the projection ranges from about 10 percent to about 33 percent of the tread width W of the tread portion. In the particular embodiment illustrated the width of the independent projections 24 is approximately 25 percent of the tread width W. For the purposes of this invention the tread width W of the tire is the axial distance across the tire as measured from the footprint of the tire when inflated to design pressure and at rated load. The projections 24 are spaced apart from each other so as to provide a plurality of grooves 26 which separate adjacent projections. The grooves 26 have a cross-sectional width such that the grooves do not close up at the surface of the tread portion when in the footprint of the tire so as to allow water to pass through the grooves.

The projections 24 have a configuration so as to allow stability of the tread portion with respect to all directions tangent to the surface of the tread portion 12. As previously stated, the principal force experienced by the tread portion when used on dry pavement is generally in the direction of travel. However, when the tire is operated on ice and/or snow-covered roads, the lateral force experienced by the tread portion of the tire, that is, directions other than in the direction of travel, become of greater importance. The particular direction in which the greatest lateral force will be experienced by the projection is dependent upon road conditions and turning maneuvers which the tire may undergo. To obtain maximum stability with regard to all tangential directions to the surface of the projection, it is desirable that the projections 24 be of a closed loop construction, such as a circle, preferably that of a polygonal configuration. In the particular embodiment illustrated, the projections 24 have a substantially symmetrical shape about its center having an outer surface 16 which comprises the plurality of straight short sides 18 arranged in a zig-zag manner in an overall configuration of that of a circle. The overall polygonal configuration of projections 24 provide substantially equal stability in all directions tangent to the surface of the tread. The outer zig-zag contour provides for a plurality of biting edges for improved traction. The projections 14 are each provided with a recessed portion 30 which forms an inner contour surface 32 in the central portion of the projection 24. The inside contour surface 32 is preferably substantially identical to the outer surface 28. The projections 24 are further provided with a plurality of blades or sipes 36 which extend from the inside contour surface 32 substantially radially outward with respect to the center of the projection 24 to the outer surface 28 dividing the projections 24 into a plurality of sub-elements 34. The blades or sipes have a way such that when in the footprint of the tire the blades 36 close up at the tread surface. Generally, the blades 36 each have a depth from the tread surface substantially the same as the depth of the grooves 26 in between the independent projections 24. Preferably, the blades 26 alternate in depth such that every other blade 36 has a depth equal to substantially one-half of the groove depth 26. The sub-elements 34 allow the independent projections 24 to react independently to the tangential forces being experienced by that sub-element. Depending upon the direction in which the tangential forces are acting upon the independent projection 24, the adjacent sub-elements assist the adjacent sub-elements to help to react to the tangential force being applied.

Figure 4:
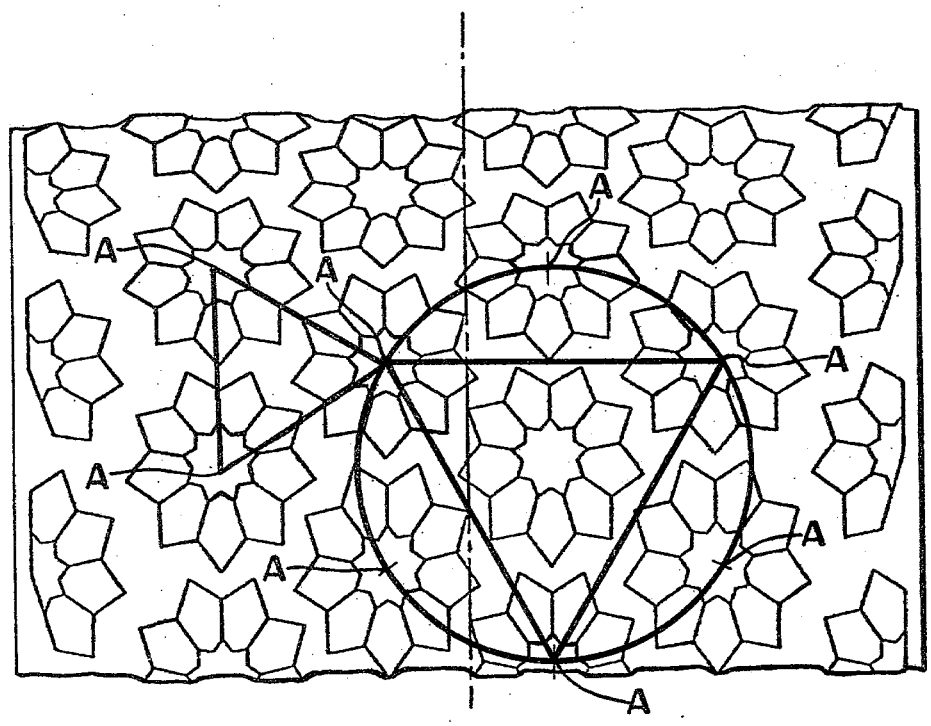
FIG. 4 is an enlarged fragmentary plan view identical to FIG. 2, illustrating the geometric relation between adjacent independent projections.

The projections 24 should be sufficiently large so that said independent projection may be divided into at least three sub-elements 34. In the particular embodiment illustrated, the independent projections 24 are divided into nine sub-elements 34. The sub-elements should be of sufficient size so as to provide some independent stability. The sub-elements should be capable of supporting at least six pounds of radial load, preferably at least seven pounds. To further improve the stability and effectiveness of the tread portion of the tire under snow and ice conditions, the independent projections 24 are arranged in a pattern such that the geometric centers A of adjacent projections form a geometric pattern such as a triangle and/or circle as is illustrated in FIG. 4.

Figure 3:
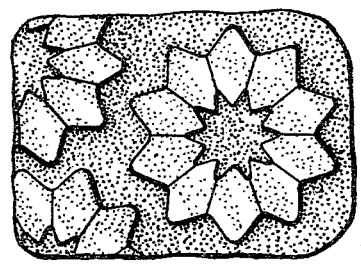
FIG. 3 is an enlarged fragmentary plan view of a modified tread element made in accordance with the present invention.

While certain representative embodiments and details have been shown for purposes of illustrating the invention, it will be apparent to those skilled in the art that various changes and modifications may be made therein without departing from the scope of the invention. For example, and not by way of limitation, projections 24 may be elongated in one direction or take alternate shapes such as illustrated in FIG. 3. It is further understood that the projections for any particular tread design will vary in accordance with normal pitching practices in the industry.

What is claimed is:

1. A pneumatic snow and ice tire comprising a circumferentially extending ground-engaging tread portion, a pair of sidewall portions extending radially inward from said ground-engaging tread portion terminating in a pair of bead portions, a cord reinforcing ply structure extending from bead portion to bead portion, said tire characterized by said tread portion consisting essentially of a plurality of independent projections each of said independent projections having a closed loop configuration which forms an internal recessed portion having an inner contour surface, said closed loop configuration being such that no groove extends from said internal surface radially outward to said outer surface of said projection, said projections being spaced apart so as to provide a plurality of grooves adjacent the outer periphery of said independent projections, the width of said grooves being sufficiently large so as to provide a plurality of water channeling passages when said tread portion is in the footprint of the tire, each of said projections having a plurality of substantially straight sipes which extend from said internal surface substantially radially outward to said outer surface dividing said projection into at least three substantially identical sub-elements, said sipes when in the footprint of the tire close at the tread surface, said sub-elements when in the footprint of the tire assist adjacent said sub-elements in resisting tangential forces.

2. A tire according to claim 1, wherein said outer configuration is substantially polygonal.

3. A tire according to claim 2, wherein said outer contour surface is in the form of a zig-zag.

4. A tire according to claim 1, wherein said inner contoured surface is substantially identical to the outer configuration of said projection.

5. A tire according to claim 1, wherein said sub-elements of each projection are substantially identical.

6. A tire according to claim 1, wherein the cord of said carcass ply structure forms an angle with respect to the mid-circumferential centerplane from about 75° to 90°.

7. A tire according to claim 1, wherein the plurality of sub-elements is nine.

8. A tire according to claim 1, wherein said internal contour surface and outer contour surface of said projections is in the form of a zig-zag pattern.

9. A tire according to claim 1, wherein said sipes alternate in depth from the tread surface radially inwardly to the axis of said tire from approximately a depth of the grooves in between said projections to approximately one-half the depth of the grooves in between said adjacent projections.

10. A tire according to claim 1, wherein said projections are arranged about the tread portion of the tire such that the geometric centers of adjacent projections form a geometric pattern.

11. A tire according to claim 10, wherein geometric centers of adjacent projections are arranged in a circular pattern.

12. A tire according to claim 10, wherein the geometric configurations are triangle.

* * * * *